Figure 1:
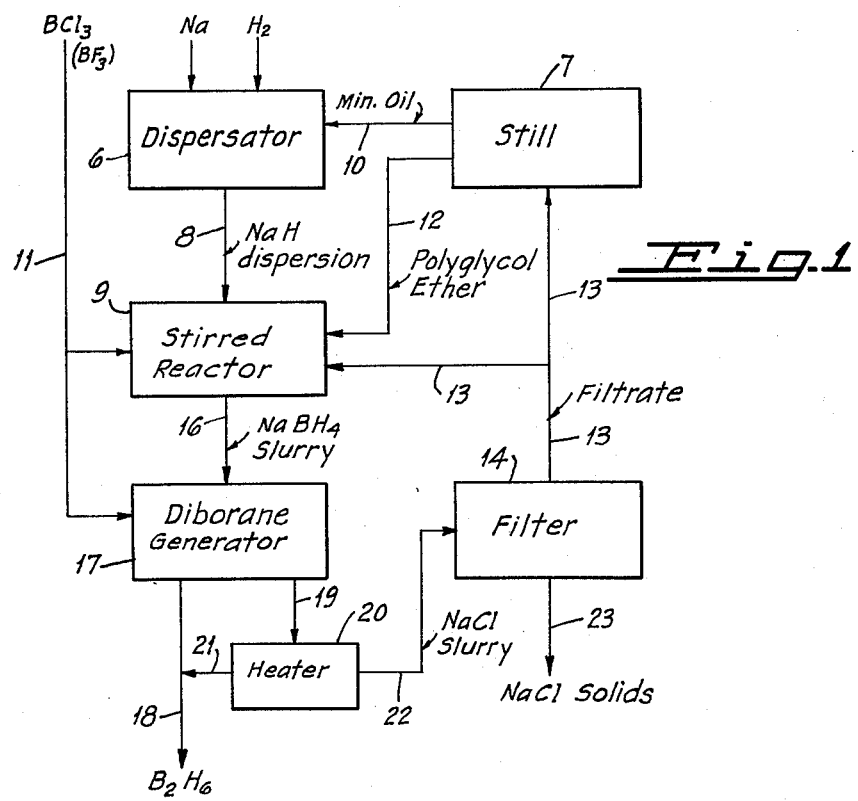

INVENTORS
Frank H. May
Howard N. Hammar 3,013,863
METHOD FOR THE PREPARATION OF
DIBORANE
Frank H. May, Whittier, and Howard N. Hammar, Long Beach, Calif., assignors to American Potash & Chemical Corporation
Filed Jan. 29, 1959, Ser. No. 790,018
2 Claims. (Cl. 23—204)

This invention relates to the preparation of boron hydrides and, more specifically, to the preparation of diborane, $B_2H_6$.

The more useful methods of preparation of diborane involve the reaction of a boron halide and a metal borohydride in the presence of an ether or other organic solvent. In the case of sodium borohydride, the reaction must be carried out in one of the glycol ethers in which the sodium borohydride is soluble. The reaction with boron trichloride produced appreciable reaction with the ether, and low yields of diborane are obtained. With boron trifluoride, the reaction proceeds readily to yield diborane and sodium fluoborate. While this latter method is a convenient laboratory procedure, it is uneconomical because of the boron trifluoride cost.

Diborane can also be generated by the reaction of a boron halide with a metal hydride in the presence of an ether. In the case of lithium hydride, this reaction can be carried out in ethyl ether by adding the boron halide to a stired slurry of lithium hydride. Under certain conditions, this reaction can be carried out using boron trifluoride to yield diborane and lithium fluoride:

$$6LiH + 2BF_3 \rightarrow B_2H_6 + LiF \quad (1)$$

With boron trichloride, the reaction proceeds readily to produce diborane and lithium chloride. While these methods, using lithium hydride and a boron halide, are adaptable to the large scale generation of diborane, each has economical disadvantages due to the cost and difficulties encountered in recovering and recycling the lithium and fluoride values.

In spite of the obvious advantages of a process using sodium hydride and boron trichloride as raw materials, present large scale diborane generation is accomplished by the reaction of boron trifluoride or chloride with lithium hydride or the reaction of sodium borohydride with boron trichloride. In view of this, it is evident that the direct reaction of sodium hydride with boron trichloride to produce diborane has not been developed into a satisfactory process.

We have discovered that the reaction between boron trichloride and sodium hydride can be catalyzed by the presence of various compounds to the end that the yield and purity of diborane is greatly improved. Additionally, we have found that the reaction of boron trichloride and sodium hydride can be carried on continuously to provide diborane in good yields and of high purity. Thus, we have found that we can produce diborane utilizing sodium hydride in a mineral oil dispersion and carrying out the reaction in an 80–95% mineral oil medium in which the balance is a solvent for sodium borohydride such as a polyglycol ether, e.g., diethylene glycol, dimethyl ether, tetraethylene glycol dimethyl ether or dimethyl ether of a polyglycol. Reaction with the ether can be minimized by holding the temperature in the reaction zone to between 20°–35° C. and maintaining a large well agitated liquid volume in the reaction zone.

The use of a mineral oil dispersion is the form in which sodium hydride is most readily made and is the form in which this material is supplied commercially; sodium hydride is thus supplied in an easily metered and safely handled form, as contrasted to all previously described processes in which dry sodium hydride must be supplied in a finely divided, pyrophoric form. The necessity and disadvantages of grinding the alkali metal hydride in an inert atmosphere are thereby avoided, and consistently higher yields are possible because of the fine particle size in which sodium hydride is supplied to the reaction in oil dispersion. The reaction with sodium hydride in this form is readily carried out in a simple, easily controlled manner and complicated apparatus is not required. The process is especially adaptable to continuous operation.

Diborane appears to be a required intermediate in the reaction between sodium hydride and boron trichloride, and the initial starting polyglycol ether-mineral oil slurry must contain sodium borohydride, diborane, or a heel of a reaction slurry from a previous cycle for reaction to take place. The ether need be present only to the extent of 5–10 percent when a mineral oil slurry of sodium hydride is used. Addition of boron trichloride initially yields a slurry of sodium borohydride when one tenth of a percent or more sodium borohydride is present to initiate the reaction. The reaction probably takes place in two stages:

$$BCl_3 + 3NaBH_4 \rightarrow 2B_2H_6 + 3NaCl \quad (2)$$
$$2B_2H_6 + 4NaH \rightarrow 4NaBH_4 \quad (3)$$

Reaction 2 appears to proceed only to the extent necessary to form sodium borohydride according to Reaction 3 as long as excess sodium hydride is present. When carrying out the reaction as described, no diborane is evolved from the slurry until that quantity of boron trichloride is added which corresponds to the stoichiometry of the equation:

$$BCl_3 + 4NaH \rightarrow NaBH_4 + 3NaCl \quad (4)$$

Diborane is evolved according to the stoichiometry of Equation 2. The over-all reaction, as carried out in a mineral oil-solvent medium, is as follows:

$$6NaH + 2BCl_3 \rightarrow B_2H_6 + 6NaCl \quad (5)$$

Under normal conditions, the sodium chloride solids formed by the reaction are very finely divided and can be filtered only with great difficulty. We have also found that the addition of small amounts of boron trifluoride or sodium fluoborate to the reaction slurry to catalyze the reaction also causes the sodium chloride solids to agglomerate to a solid form, which solids settle rapidly and can be easily filtered using conventional filtering equipment.

In developing the present process, the initial investigations were concerned with testing the general method as outlined in the literature. These tests were run as follows:

*Test I.*—The reactor consisted of a 200 ml. three-neck Pyrex flask fitted with stirrers, thermometer, a Dry Ice cold finger, and gas entry ports. The flask was immersed in a thermostatically controlled oil bath. A sweep gas of nitrogen was used at all times, through the reactor, a Dry Ice cold finger, a gas bulb and into a scrubber system.

A quantity of 149 grams of Ansul ether E–181 (tetraethylene glycol dimethyl ether) was placed in the reaction flask, and 15 grams of dry granular sodium hydride were added to this ether solution. The entire system was swept with nitrogen, and the oil bath was heated to 80° C. While rapidly stirring the reaction mixture, boron trichloride was added to the reaction flask while maintaining a small nitrogen sweep. The boron trichloride was added at approximately 12 grams per hour. The addition of boron trichloride was discontinued after 10 grams had been added, since a heavy reflux of boron trichloride was evident and the sodium hydride appeared unchanged. Periodic samples of the sweep gases were free of any infrared spectrum for diborane. The reaction flask filtrate was found to fume strongly and was acidic, containing unreacted boron trichloride.

From the results of this run, it was evident that boron trichloride is not directly reactive with sodium hydride.

Having conceived that the reaction might be promoted or catalyzed, essentially the same procedure as outlined above was followed except that a small amount of sodium borohydride was added to start the reaction. The details of this run are as follows:

*Test II.*—The equipment and procedure was the same as in Test I. A quantity of 15.0 grams of dry granular sodium hydride was added to 278 grams of Ansul ether E–141 (diethylene glycol dimethyl ether) containing 2.8 grams of sodium borohydride. A quantity of 27.2 grams of boron trichloride was then added at approximately 10 grams per hour. The slurry was then heated to 100° C. and cooled. This slurry was essentially a gel and could not be filtered. The slurry was settled by centrifuging and the supernatant was found to be slightly acidic, containing 0.6 milliequivalent of acidity per gram. The scrubber liquor was found to contain boron equivalent to 2.21 grams of diborane, representing a yield of 52.5%.

From the results of this run, it was evident that boron trichloride would react with sodium hydride in the presence of a catalyst to produce diborane but that the yield was low although it provided an improvement over what was known heretofore. Repeating the reaction at different temperatures and rates of boron trichloride addition failed to yield appreciably better results. An infrared scan of the evolved gases showed considerable methane and methyl chloride with the diborane. The sodium chloride slurries produced in Examples I and II were essentially gels and could not be filtered except by centrifugal settling.

*Test III.*—Mineral oil-sodium hydride dispersions were used and the reaction was carried on in mineral oil with only 5–10% of a glycol ether present as a promotor along with a trace (0.1–0.2%) of sodium borohydride. The object of these runs was threefold: (1) to determine if the decomposition of the ether could be minimized by dilution with mineral oil which should also serve to dissipate the heat of reaction; (2) to allow the use of mineral oil-sodium hydride dispersions which are much less hazardous to handle and prepare than the dry hydride; and (3) to dilute the expensive glycol ether and thus effectively reduce the entrainment losses of this solvent with the sodium chloride solids.

In testing out the process under these conditions, it was found that the reaction proceeded easily and with a distinct improvement in efficiency as contrasted with the previous experiments.

During these runs, the diborane generation and decomposition reactions were evaluated by monitoring the gas stream quantity and composition against the boron trichloride addition. From these tests it was evident that little diborane evolution takes place until something over three-quarters of the theoretical amount of boron halide has been added. Very evidently, an initial reaction takes place to produce sodium borohydride by the reaction of the diborane with the excess NaH:

$$B_2H_6 + 2NaH \rightarrow 2NaBH_4$$

In spite of the improved yields of diborane with the mineral oil medium, the efficiency was still low and results were quite variable.

The effect of an additional catalyst or promotor in the system was then examined and it was found that a small amount of $NaBF_4$ which was added as a saturated quantity in the glycol ether was effective. When using the solvent composed of 90% mineral oil, 10% ether, the $NaBF_4$ concentration was in the range of 0.2 to 0.4 percent. With this amount of sodium fluoborate present in the reaction, consistently higher yields of diborane were obtained and the reaction proceeds smoothly to completion. A secondary, but extremely important effect of the sodium fluoborate addition was the agglomeration of the sodium halide solids which permits settling and filtration of the reaction slurry. This latter effect is very important for a practical commercial process.

The process can be carried out continuously in a large tank by metering in the mineral oil-sodium hydride slurry and boron trichloride in the proper ratio, along with recycled liquors. The diborane is drawn off continuously as a gas, and the spent reactants as a neutral sodium chloride slurry. The liquid in the tank should be from about five times the weight of the sodium hydride so that ample liquid is present.

The reaction can be carried out as a batch operation, as in FIGURE 1, wherein, for example, separate streams of sodium and hydrogen were fed into a dispersator 6 along with mineral oil from the line 10 from still 7, to form a sodium hydride dispersion which is passed through line 8 into a reactor 9 equipped with a suitable stirring device. Boron trichloride containing a small amount of boron trifluoride was fed in through line 11, while the polyglycol ether was sent in through line 12 from the still 7. Recycle filtrate was added from line 13 from the filter 14. In the reactor 9, the reaction proceeded to the borohydride stage. The slurry from the reactor 9 was then sent through line 16 to the diborane generator 17, to which additional boron trichloride containing a small amount of boron trifluoride was added from line 11. The gas phase from the diborane generator was taken off through line 18, while the liquid slurry phase was taken through line 19 and sent to a heater 20, which vaporized any diborane present, this being added through line 21 to line 18. The sodium chloride slurry was sent through line 22 to the filter 14, from which the sodium chlorides solids were removed through line 23, the filtrate being removed through line 13, partly to the reactor 9 and to the still 7.

By operating two or more of the stage reactors 9 and 17 in parallel, it is possible to obtain completely continuous operation and still attain the advantages of batch operation. The large volume of liquid permits dilution of the reaction by exposing a large surface area of the boron halide gas. For example, reactor 9 can include a large tank wherein the liquid is well agitated.

Figure 2:
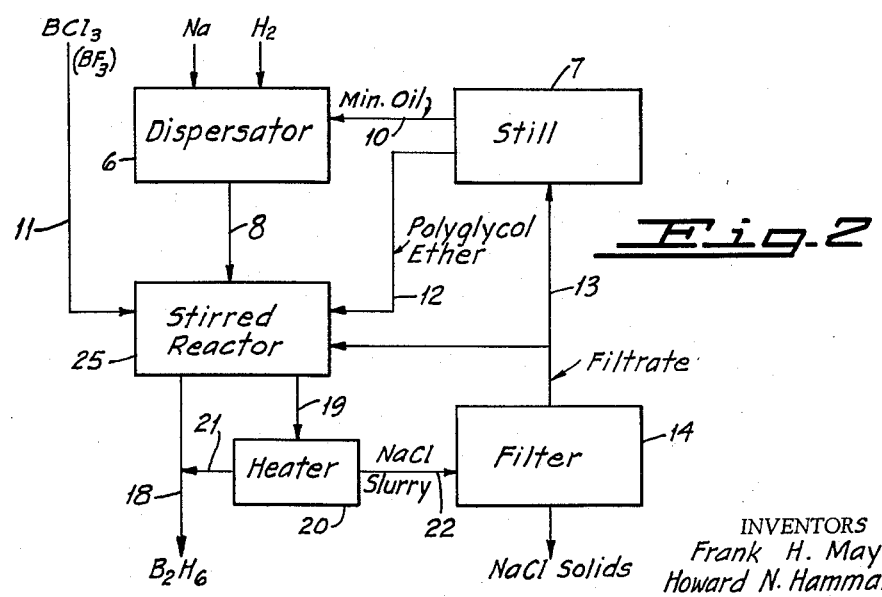

A similar continuous operation is shown in FIGURE 2 wherein the entire reaction is carried on in a single reactor 25.

The preferred conditions of operation are the same for either batch or continuous operation. The temperature should be maintained between 25° and 35° C. during the boron trichloride addition and possible localized reaction should be minimized by vigorous agitation of the reaction slurry. In batch operation, a minimum decomposition of the ether is obtained when the $BCl_3$ addition rate is controlled to allow 8 to 12 hours for complete reaction of the hydride slurry.

In carrying out the improved process under controlled conditions, diborane efficiencies of 75–80% were consistently obtained. Several examples of this are described below.

*Example I.*—The equipment used was the same as in Test 1, except for the substitution of a 500 ml. three-neck flask in place of the 200 ml. flask. The evolved diborane was collected and hydrolyzed with a 60% water, 40% acetone solution.

A quantity of 43 grams of sodium hydride, mineral oil dispersion (54.5% NaH) was placed in the flask along with 204 grams of Bayol 85 mineral oil and 35 grams of Ansul ether E–141 containing 1.77% $NaBH_4$ and 4.6% $NaBF_4$ in solution. The system was swept with nitrogen and boron trichloride gas was then added at 10 grams per hour over the surface of the stirred slurry maintained at 20–35° C. Rapid gas evolution was noted during the addition of the final one-quarter of the required boron trichloride. On completion of the addition, the slurry was heated to 100° C. to remove dissolved diborane, and was then cooled and filtered. The filtrate obtained was neutral. A quantity of 63 grams of solids were obtained, analyzing 88% NaCl. The scrubber liquor contained boron equivalent to 3.61 grams diborane, representing a yield of 75.4%.

*Example II.*—In this example, 43.0 grams of sodium hydride-mineral oil dispersion (54.5% NaH), 215 grams of Bayol 85 mineral oil, and 24.0 grams of Ansul ether E-141 containing 1.5% NaBH$_4$ in solution were used to make up the initial slurry. A quantity of 40.3 grams of boron trichloride gas was added at 10 grams per hour, along with a trace of boron trifluoride amounting to 1.0 gram over the total addition time. On completion of the addition, the slurry was heated, cooled, and filtered as before. A total of 64 grams of solids were obtained, analyzing 85% NaCl. The scrubber liquor contained boron equivalent to 3.83 grams of diborane, representing a yield of 82.0%.

*Example III.*—The process was demonstrated on a larger scale, using a seven gallon stainless steel tank as a reaction vessel. This tank was equipped with a stirrer, sight glass, nitrogen sweep, and a gas vent leading to the diborane absorption system.

The absorption system consisted of a packed scrubbing tower over which triethylamine was continuously circulated. At the conclusion of the run, the triethylamine-diborane adduct was removed for analysis.

The reactor was charged with 8740 grams of slurry containing 10% NaH, 10% Ansul ether E-141, 80% Bayol 85, and 0.2% NaBH$_4$. Boron trichloride was added continuously at 176 grams per hour, until a total of 1422 grams had been added. A small quantity of boron trifluoride (less than 0.1 cu. ft. per hour) was added concurrently with the boron trichloride. Gas samples were taken at 30 minute intervals. When approximately 70% of the boron trichloride had been added, diborane evolution began to occur in steady manner. Diborane purities of as high as 98% were obtained without purification during this diborane generation. At the conclusion of the addition of boron trichloride, the reaction slurry was heated to 85° C. to complete the reaction and remove additional dissolved diborane from the reaction media. The slurry was then cooled and readily filtered using a commercial pressure filter of 2 square foot area.

The scrubber liquor was analyzed and found to contain 121 grams of diborane, corresponding to a yield of 71% based on sodium hydride.

*Example IV.*—The reaction was carried out on the same scale using the filtrate from a previous cycle. In each case, additional Ansul ether E-141 was added only to replace the small amount (1-2%) lost by decomposition in the previous cycle. Three cycles were carried out in this manner with similar results.

*Example V.*—The first stage reaction was carried out in a 500 gallon agitated jacketed tank, equipped with a reflux condenser and recirculating pump for pumping the reaction mixture through a heat exchanger and back into the reactor. The recirculated slurry was pumped back into the agitated tank reactor through concentric opening surrounding the BCl$_3$ feed line to increase the liquor surface to gas contact area. The tank was also equipped with a sight glass, nitrogen purge, and a gas vent to a diborane absorption system.

The reactor was charged with 25 percent NaH-mineral oil slurry containing 315 pounds of sodium hydride, along with additional mineral oil, Ansul ether E-141, and NaBH$_4$ to produce a final slurry containing approximately 9 percent NaH, 9 percent Ansul ether E-141, 82 percent mineral oil and 0.2 percent NaBH$_4$. The entire system was first swept with nitrogen and boron trichloride was then added continuously to the well agitated reaction slurry over a period of about 18 hours until a total of approximately 379 pounds had been added. A small quantity (3 pounds) of boron trifluoride was added concurrently with the boron trichloride. The temperature of the reaction slurry was maintained between 25 and 35° C. throughout the BCl$_3$ addition. Gas samples taken during this period were free of diborane. A chemical analysis of the reactor slurry indicated approximately 98 percent conversion of the NaH to NaBH$_4$.

Approximately 100 gallons of the first stage slurry was next pumped into a second, small agitated tank equipped with a vacuum line, nitrogen purge line, gas inlet dip tube and a gas vent leading to a Dry Ice trap and diborane storage system. The tank was fitted with a coil arrangement for heating and cooling purposes.

In carrying out the second stage reaction, the vapor space was first evacuated and tested for leaks. Boron trichloride was then added to the evacuated reactor at a predetermined rate until a pressure of approximately 8 pounds was established. The exhaust line was then opened and diborane was generated and evolved at a steady rate throughout the BCl$_3$ addition period and subsequent heating of the slurry to 80-100° C. The composition of the diborane throughout this period averaged better than 96 percent pure. At the end of the heating period the slurry was cooled and centrifuged to separate the sodium chloride solids. The filtrate was saved for subsequent recycle preparations. The second stage operations were repeated with additional portions of the first stage slurry. A small amount of the first stage slurry was left in the number one reactor to serve as a borohydride heel for subsequent preparations.

We claim:
1. A process for the preparation of diborane by the reaction of sodium hydride and boron trichloride comprising: forming a dispersion of sodium hydride in mineral oil, said mineral oil containing at least about 5% of a polyglycol ether; adding to said dispersion a small amount of a promoter selected from the class consisting of sodium borohydride and diborane; passing into said dispersion a stream of boron trichloride together with a small amount of a compound selected from the class consisting of boron trifluoride and sodium fluoborate whereby to form diborane and a suspension of sodium chloride in said mineral oil and said polyglycol ether; withdrawing said diborane therefrom as said diborane is formed; separating the said sodium chloride from the said mineral oil and said polyglycol ether and recycling said mineral oil and polyglycol ether to the said reaction zone.

2. The process of claim 1 wherein the said promoter is sodium borohydride.

References Cited in the file of this patent

UNITED STATES PATENTS

| | | |
|---|---|---|
| 1,958,012 | Muckenfuss | May 8, 1934 |
| 2,469,879 | Hurd | May 10, 1949 |
| 2,544,472 | Schlesinger | Mar. 6, 1951 |
| 2,596,690 | Hurd | May 13, 1952 |
| 2,720,444 | Banus et al. | Oct. 11, 1955 |
| 2,796,328 | Jackson et al. | June 18, 1957 |
| 2,796,329 | Jackson et al. | June 18, 1957 |
| 2,889,194 | McElroy | June 2, 1959 |

OTHER REFERENCES

Brown et al.: "J. Am. Chem. Soc.," vol. 80, pages 1552-58, April 5, 1958.